(12) United States Patent
Iimori et al.

(10) Patent No.: US 11,714,000 B2
(45) Date of Patent: Aug. 1, 2023

(54) DETECTION DEVICE AND DETECTION SYSTEM

(71) Applicant: CANON KABUSHIKI KAISHA, Tokyo (JP)

(72) Inventors: Kento Iimori, Tokyo (JP); Noriyuki Kaifu, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 16/985,940

(22) Filed: Aug. 5, 2020

(65) Prior Publication Data

US 2021/0041289 A1    Feb. 11, 2021

(30) Foreign Application Priority Data

Aug. 7, 2019 (JP) ................. 2019-145527

(51) Int. Cl.
 *G01J 1/44* (2006.01)
 *G01N 22/00* (2006.01)
(52) U.S. Cl.
 CPC ............ *G01J 1/44* (2013.01); *G01N 22/00* (2013.01); *G01J 2001/448* (2013.01)
(58) Field of Classification Search
 CPC .......... G01J 1/44; G01J 2001/448; G01J 3/42; G01N 22/00; H04N 5/33; H04N 5/369; H04N 5/378; G01V 3/12
 See application file for complete search history.

(56) References Cited

U.S. PATENT DOCUMENTS

| | | | | |
|---|---|---|---|---|
| 5,705,807 A | * | 1/1998 | Throngnumchai | H03F 3/087 |
| | | | | 356/221 |
| 6,909,095 B2 | * | 6/2005 | Tran | G01N 21/3581 |
| | | | | 250/341.1 |
| 8,658,976 B2 | * | 2/2014 | Sengupta | G01N 21/3581 |
| | | | | 250/341.1 |

(Continued)

FOREIGN PATENT DOCUMENTS

| JP | 8-122149 A | 5/1996 |
|---|---|---|
| JP | 2014-175819 A | 9/2014 |

(Continued)

OTHER PUBLICATIONS

Extended European Search Report dated Oct. 21, 2020, in counterpart application EP 20189822.8 (5 pages).

*Primary Examiner* — Seung C Sohn
(74) *Attorney, Agent, or Firm* — Venable LLP

(57) ABSTRACT

A detection device with pixels arranged in N rows and M columns where N and M are each an integer of one or more, each of the pixels including: a detector configured to detect an electromagnetic wave; a first capacitor connected to the detector; a first switch and a second switch each connected to a terminal of the first capacitor opposite to the detector; and a second capacitor connected to a terminal of the second switch opposite to the first capacitor, wherein each of a terminal of the first switch opposite to the first capacitor and a terminal of the second capacitor opposite to the second switch is connected to a reference potential, and wherein an integration operation of turning ON/OFF the first switch and then turning ON/OFF the second switch while maintaining the first switch in an OFF state is repeatedly performed a plurality of times.

33 Claims, 7 Drawing Sheets

(56) References Cited

U.S. PATENT DOCUMENTS

| | | |
|---|---|---|
| 9,667,901 B2 | 5/2017 | Sakai et al. |
| 9,961,280 B2 | 5/2018 | Sekiguchi et al. |
| 10,313,588 B2 | 6/2019 | Ikedo |
| 2004/0155192 A1 | 8/2004 | Tran et al. |
| 2004/0155193 A1 | 8/2004 | Tran et al. |
| 2012/0245873 A1* | 9/2012 | Donnangelo .......... G01N 27/02 |
| | | 324/201 |
| 2013/0193324 A1 | 8/2013 | Sengupta et al. |
| 2014/0117237 A1 | 5/2014 | Corcos et al. |
| 2014/0284483 A1 | 9/2014 | Corcos et al. |
| 2014/0367575 A1 | 12/2014 | Sengupta et al. |
| 2015/0365611 A1* | 12/2015 | Sekiguchi ......... H01L 27/14609 |
| | | 250/208.1 |
| 2016/0006968 A1 | 1/2016 | Sakai et al. |
| 2018/0302561 A1 | 10/2018 | Ikedo |
| 2020/0304695 A1 | 9/2020 | Itsuji et al. |

FOREIGN PATENT DOCUMENTS

| | | |
|---|---|---|
| JP | 2016-15633 A | 1/2016 |
| JP | 2018-182543 A | 11/2018 |
| JP | 2019-105622 A | 6/2019 |

* cited by examiner

… (1)

DETECTION DEVICE AND DETECTION SYSTEM

BACKGROUND OF THE INVENTION

Field of the Invention

The present invention relates to a detection device and a detection system.

Description of the Related Art

In recent years, a detection device that detects an electromagnetic wave including at least any of frequency components within a frequency band of 0.3 THz to 30 THz has been developed. The detection of the electromagnetic wave allows for even imaging of respective intensities of individual pixels arranged in two dimensions (terahertz camera). In the present disclosure, an electromagnetic wave in the frequency band mentioned above is simply referred to also as a terahertz wave.

The terahertz camera is considered to be industrially useful. This is because the terahertz camera has such characteristic features that, similarly to an X-ray, the terahertz wave is transmitted by a non-metal substance, a large number of absorption spectra specific to biological molecules, medical items, or the like are present in a terahertz wave band, and the terahertz camera has a spatial resolution required for a large number of imaging applications. Conceivable application fields of the terahertz wave include a spectroscopic technique for analyzing the interior of a substance, a safe see-through imaging device which replaces the X-ray, an analysis technique for biological molecules or medical items, and the like.

Japanese Patent Application Publication No. 2014-175819 describes a detection device including a two-dimensional-array detection element with reduced low-frequency noise.

When the technology described in Japanese Patent Application Publication No. 2014-175819 is used, rather-low-noise signal detection can be performed using a property of synchronous detection. However, a problem arises in that it is impossible to fully utilize a terahertz wave having reached an element to which reading has not been performed. For example, when row-by-row reading is performed to an N-row by M-column two-dimensional-array detection element, it is impossible to acquire a terahertz wave detection signal from a row which is not selected to be subjected to the reading.

SUMMARY OF THE INVENTION

The present disclosure has been achieved in view of such a problem, and an object of the present invention is to provide a detection device and a detection system each capable of integrating/storing detection signals.

The first aspect of the disclosure is a detection device comprising:

pixels arranged in N rows and M columns where N and M are each an integer of one or more, each of the pixels including:

a detector configured to detect an electromagnetic wave;

a first capacitor connected to the detector;

a first switch and a second switch each connected to a terminal of the first capacitor opposite to the detector; and a second capacitor connected to a terminal of the second switch opposite to the first capacitor, wherein each of a terminal of the first switch opposite to the first capacitor and a terminal of the second capacitor opposite to the second switch is connected to a reference potential, and wherein an integration operation of turning ON/OFF the first switch and then turning ON/OFF the second switch while maintaining the first switch in an OFF state is repeatedly performed a plurality of times.

According to the disclosure, a detection device and a detection system each capable of integrating/storing detection signals can be provided.

Further features of the present invention will become apparent from the following description of exemplary embodiments with reference to the attached drawings.

DESCRIPTION OF THE EMBODIMENTS

First Aspect

Figure 1:
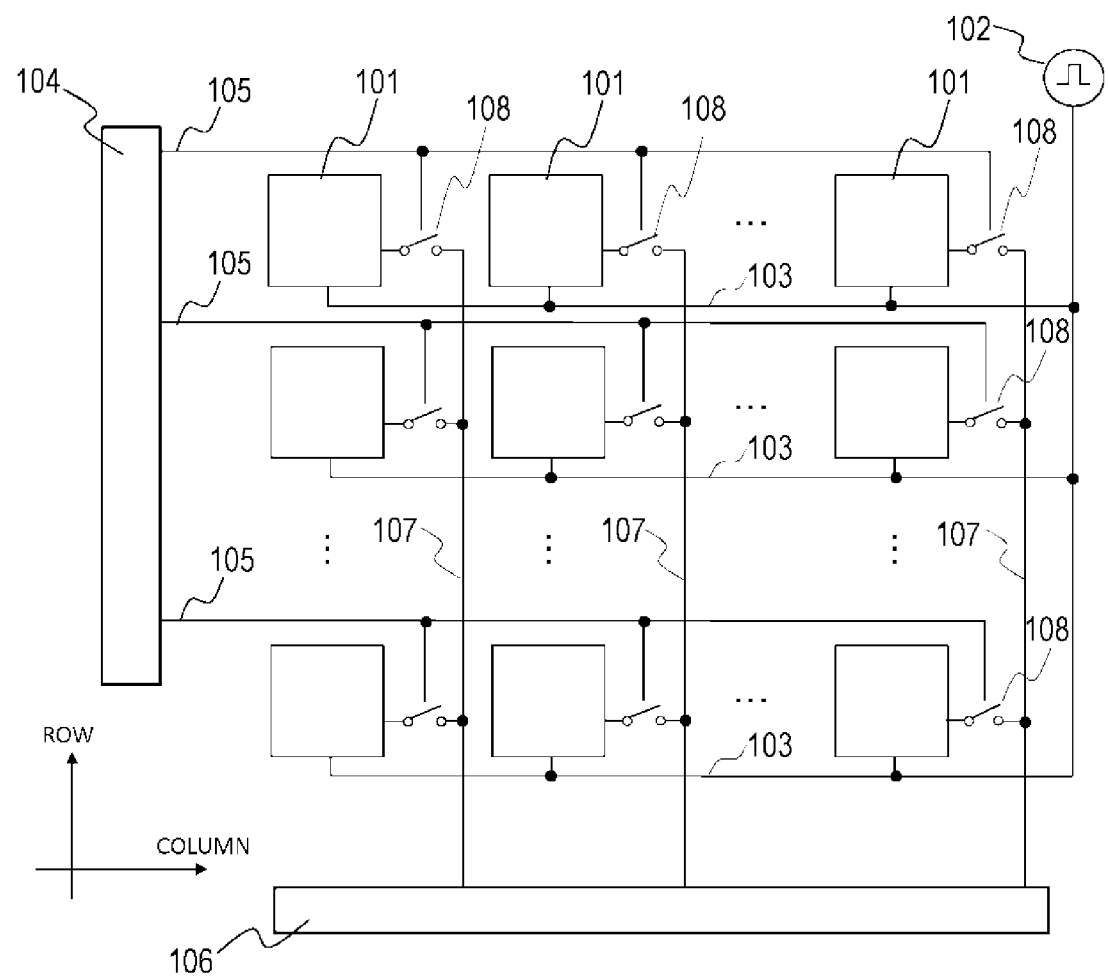
FIG. 1 is a diagram illustrating a configuration of an imaging device according to a first aspect of the present invention.

Referring to FIG. 1, a description will be given of an imaging device (terahertz camera) according to a first aspect of the present invention. The imaging device according to the first aspect can be considered as a detection device that detects a terahertz wave. FIG. 1 is a schematic diagram illustrating an arrangement of pixels in the first aspect. In FIG. 1, 101 denotes the pixels each including a detector for detecting an electromagnetic wave from a subject, which are arranged in N rows and M columns (each of N and M is an integer of two or more). In the first aspect, the pixels are two-dimensionally arranged in a plurality of rows and a plurality of columns, but the number of the rows and the number of the columns are not particularly limited. The reference number 102 denotes a signal generation unit that generates a control signal, 103 denotes control-signal transmission lines, 104 denotes a vertical scanning circuit, 105 denotes vertical scanning lines, 106 denotes a signal processing circuit, 107 denotes read lines, and 108 denotes transistors connected to the individual pixels 101 to function as selection switches for reading signal charges from the pixels 101. Through turning ON of the switches 108 in the row selected by the vertical scanning circuit 104, signals are read from the pixels 101 in the selected row to the signal processing circuit 106 via the read lines 107. The signal processing circuit 106 performs signal processing such as amplification of the read signals and noise filtering and digitization of the signals using an analog-to-digital converter (ADC). The row selected by the vertical scanning circuit 104 is switched from one to another, and each of the N rows is sequentially subjected, one after another, to reading within a 1-frame read period. In a stage subsequent to the signal processing circuit 106, an image processing circuit (not shown) is provided to form an image from the read detection signals.

Figure 2:
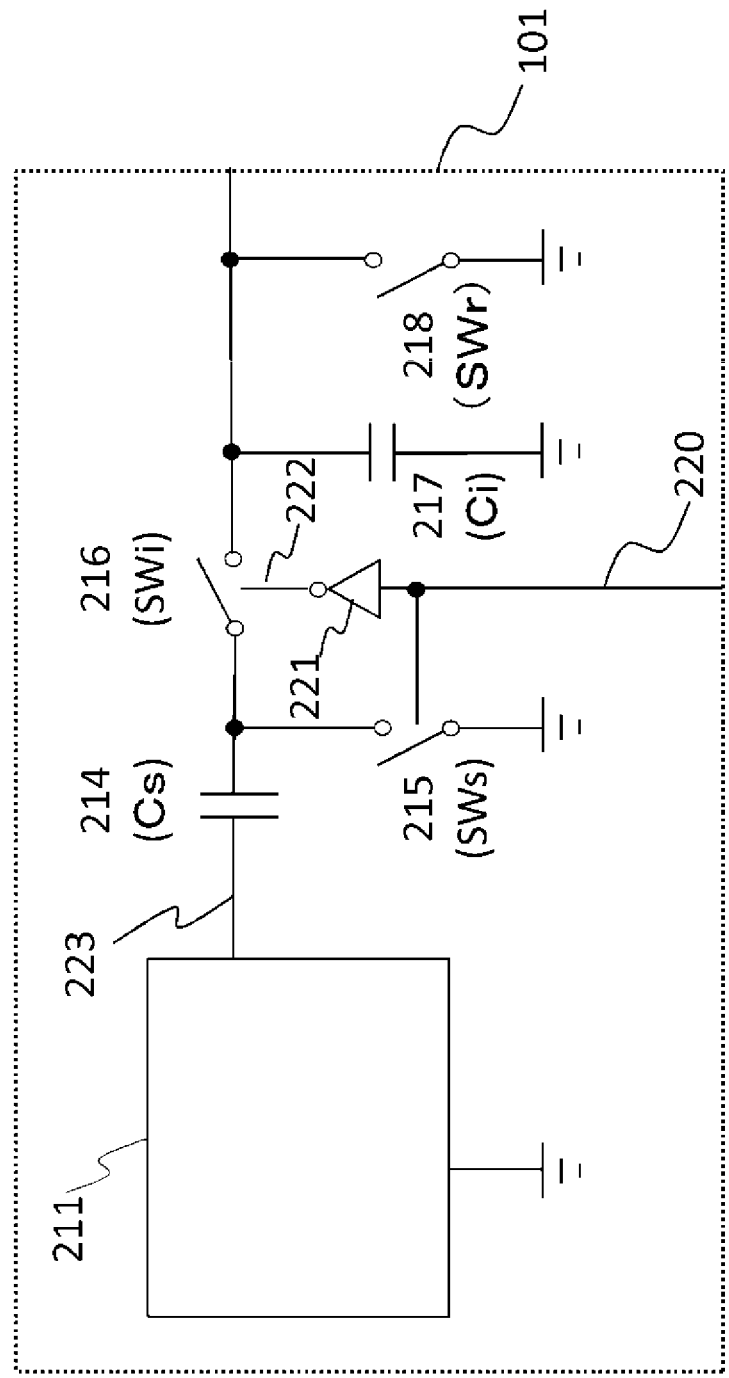
FIG. 2 is a diagram illustrating the configuration of the imaging device according to the first aspect.

FIG. 2 is a schematic diagram illustrating one of the pixels in the first aspect. The pixel 101 is configured to include a detector 211, a storage capacitor Cs214, a switch SWs215, a switch SWi216, a storage capacitor Ci217, and a reset switch SWr218. The storage capacitor Cs214 corresponds to a first capacitor (a first condenser), the storage capacitor Ci217 corresponds to a second capacitor (a second condenser), the switch SWs215 corresponds to a first switch, and the switch SWi216 corresponds to a second switch.

The Cs214 is connected to the detector 211 to store signal charges detected by the detector 211. The switch SWs215 is a switch for resetting one terminal of the Cs214 to a reference potential. The switch SWi216 is a switch for controlling charge transfer from the Cs214 to the Ci217. The switch SWr218 is a switch for resetting one terminal of the Ci217 to the reference potential. The SWs215 has one terminal connected to a terminal of the Cs214 opposite to the detector 211, while having the other terminal connected to the ground. The SWi216 has one terminal connected to a terminal of the Cs214 opposite to the detector 211, while having the other terminal connected to the Ci217. The Ci217 has one terminal connected to the ground, while having the other terminal connected to the SWi216. The switch SWr218 has one terminal connected to the ground, while having the other terminal connected to the Ci217.

The reference number 220 denotes a control-signal transmission line for the SWs215 which is connected to a control terminal of the SWs215, and 221 denotes an inverter (NOT gate) which is connected between the control-signal transmission line 220 and a transmission line 222. The transmission line 222 is connected to a control terminal of the SWi216.

The detector 211 is configured to include an electromagnetic-wave detection element and an amplifier for amplifying a detection signal. A signal output from the detector 211 repeatedly outputs, via the transmission line 223, a first potential serving as an output level during non-radiation from a terahertz light source and a second potential serving as an output level during radiation from the terahertz light source. It is assumed herein that the first potential and the second potential are not constant but varies.

The SWs215 and SWi216 operate, based on the control signal transmitted from the control-signal transmission line 220, in synchronization with the presence or absence of radiation from the terahertz light source. In the first aspect, operations of switching the SWs215 and SWi216 are repeated to integrate/store, in the second storage capacitor Ci217, the signal received by the first storage capacitor Cs214 and output from the detector 211. The following will describe the integration/storage operation in detail.

Figure 3:
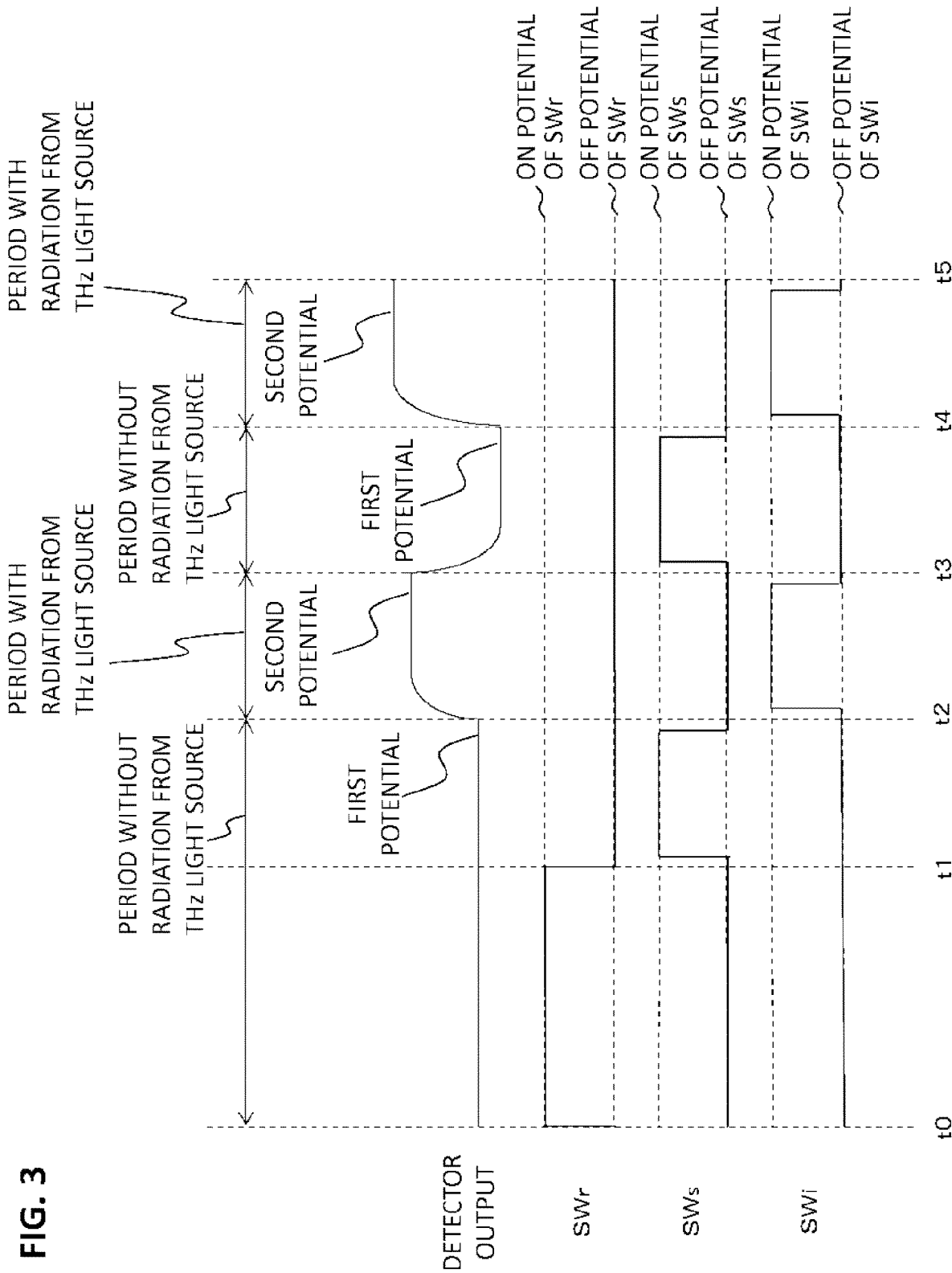
FIG. 3 is a timing chart associated with operations in the first aspect.

FIG. 3 is a timing chart illustrating an operation of one of the pixels in the first aspect.

During a t0-t1 period, the SWi216 and SWs215 are in an OFF, while the SWr218 is brought into an ON state to reset the second storage capacitor Ci217. During the t0-t1 period, radiation/non-radiation from the terahertz light source and a state of the output from the detector do not affect an operation of resetting the Ci217. Specifically, during the t0-t1 period in FIG. 3, there is non-radiation from the terahertz light source and the detector output is at the first potential, but there may also be radiation or non-radiation from the terahertz light source or, alternatively, radiation and non-radiation may be repeated.

A t1-t2 period corresponds to a terahertz-light-source non-radiation period, and the output from the detector 211 is at the first potential serving as the output level during non-radiation from the terahertz light source. During the t1-t2 period, the SWr218 and SWi216 are in the OFF state, while the SWs215 is subjected to an ON/OFF operation to reset one terminal of the Cs214 to the reference potential.

A t2-t3 period corresponds to a terahertz-light-source radiation period, and the output from the detector 211 is at the second potential serving as the output level during radiation from the terahertz light source. As a result of a shift of the output from the detector 211 from the first potential to the second potential, a signal representing a difference between the first potential and the second potential is held as charges in the first storage capacitor Cs214. During the t2-t3 period, the SWr218 and SWs215 are in the OFF state, while the SWi216 is subjected to the ON/OFF operation. When the switch SWi216 is subjected to the ON/OFF operation during the t2-t3 period, charges stored in the first storage capacitor Cs214 are moved as a value determined by the first storage capacitor Cs214 and the second storage capacitor Ci217 in accordance with a principle of conservation of charge to the Ci217 and held therein.

A t3-t4 period corresponds to the terahertz-light-source non-radiation period, and the output from the detector 211 is at the first potential serving as a potential during non-radiation from the terahertz light source. During the t3-t4 period, due to fluctuations in detector output, the first potential is mostly unequal to the first potential during the t1-t2 period. During the t3-t4 period, the respective operations of the SWr, SWs, and SWi are the same as those during the t1-t2 period.

A t4-t5 period corresponds to the terahertz-light-source radiation period, and the output from the detector 211 is at the second potential serving as the output level during radiation from the terahertz light source. During the t4-t5 period, due to fluctuations in detector output, the second potential is mostly unequal to the second potential during the t3-t4 period. The fluctuations in the first and second potentials can be reduced by an averaging effect achieved by repeating an integration operation described later. During the t4-t5 period, the respective operations of the SWr, SWs, and SWi are the same as those during the t2-t3 period.

During t3 and subsequent periods, the operations during a t1-t3 period are repeated a plurality of times until the reading of the potential from the second storage capacitor Ci217. When respective capacitances of the first storage capacitor Cs214 and the second storage capacitor Ci217 are selected appropriately, every time the operations during the t1-t3 period are repeated, charges held in the second storage capacitor Ci217 increase to result in such an operation as to integrate signals. For the sake of description, the ON/OFF operation of the SWi216 performed in a state where the SWs215 is held in the OFF state after the ON/OFF operation of the SWs215 during a period including and subsequent to t1 is referred to as "one integration operation".

Note that, in the first aspect, the ON/OFF operation of the SWs215 is performed during the t1-t2 period, and the ON/OFF operation of the SWi216 is performed during the t2-t3 period. However, the operations of the switches are not limited to these periods. Since the ON/OFF operation of the SWs215 is intended to obtain the first potential for the detector output, the ON/OFF operation of the SWs215 may be performed appropriately at a time when the output from the detector 211 is at the first potential or at a time when the output from the detector 211 is at a potential in the vicinity of the first potential. Likewise, since the ON/OFF operation of the SWi216 is intended to obtain the second potential for the detector output, the ON/OFF operation of the SWi216 may be performed appropriately at a time when the output from the detector 211 is at the second potential or at a time when the output from the detector 211 is at a potential in the vicinity of the second potential. However, when the SWs215 and SWi216 are simultaneously turned ON, charges held in the Ci217 flow out thereof, and therefore it is required to avoid simultaneous turning ON of the SWs215 and SWi216 during the sequential integration operation.

Retrieval of a differential signal between the first potential and the second potential using the first storage capacitor Cs214 is performed by correlated double sampling. Thus, it is possible to obtain an effect of reducing DC-type noise/low-frequency noise such as low-frequency noise generated from an electromagnetic-wave detection element in the detector 211 and kTC noise generated from a circuit including an amplifier.

As a result of repeating the integration operation, signals each corresponding to the difference between the first and second potentials are integrated a number of times corresponding to the number of times of the integration, in the second storage capacitor Ci217. Fluctuations in the first and second potentials resulting from the repeatedly performed integration operation can be reduced herein by the averaging effect. As the number of times the integration is performed is larger, the effect of averaging the fluctuations is larger, but the number of times the integration is performed is limited by a capacitance ratio of the second storage capacitor Ci217 to the first storage capacitor Cs214. When the difference between the first and second potentials is assumed to be V1 and a potential of the capacitor Ci217 is assumed to be V2, a potential V2' of the capacitor Ci217 after one integration operation is given by Expression (1) where Ci and Cs represent respective electrostatic capacitances of the first storage capacitor Cs214 and the second storage capacitor Ci217.

$$V_2' = V_2 + \frac{C_s}{C_i + C_s}(V_1 - V_2) \quad (1)$$

In other words, when the integration is repeated and V2 approaches V1, a change in VT resulting from the one integration approaches 0. This means that, when the integration is repeated, the potential V2 of the Ci217 is saturated at the potential V1. When the capacitance ratio Ci/Cs is increased herein, the number of times the integration is performed until the potential V2 is saturated can be increased. In the first aspect, a rolling read operation is performed such that each of the N rows is sequentially subjected, one after another, to reading during the 1-frame read period. When N>1 is satisfied, each of the pixels repeats the integration operation throughout a read period for (N−1) rows except for a period during which the pixel is subjected to reading. When it is assumed that one integration operation corresponding to the minimum number of times the integration is performed during a read period for one row, the capacitance ratio Ci/Cs of the second storage capacitor Ci217 to the first storage capacitor Cs214 is set to (N−1) or more. The electrostatic capacitance Cs of the first storage capacitor Cs214 and the electrostatic capacitance Ci of the second storage capacitor are set so as to satisfy a relationship given by Ci/Cs>N−1. Thus, it is possible to perform the (N−1) or more integration operations without involving saturation of the Ci217. The following is a detailed description of conditions required therefor.

First, the number of the integration operations within the read period for one row is preferably set to an integer n in terms of simplifying the control signal in respective operations of the signal generator 102 that generates pulses of the control signal 220, the vertical scanning circuit 104, and the signal processing circuit 106. If the number of the integration operations within the read period for one row is assumed to be less than 1 (one storage operation within a read period for a plurality of rows), commonality of the vertical scanning line 105 and the control-signal transmission line 103 across the rows is not allowed. This greatly complicates a configuration and control and is significantly disadvantageous in terms of signal precision and cost. Even when the number of the storage operations within the read period for one row is set to a non-integer larger than 1, the same problem arises. Meanwhile, as long as the number of the integration operations within the read period for one row is an integer, there is no complication of a configuration and control. In other words, it is appropriate that n is an integer of one or more. Accordingly, the number of the integration operations is (N−1) and smallest when n=1 is satisfied, and therefore the number of the integration operations is not less than (N−1). If it is assumed herein that Ci/Cs<N−1 is satisfied, signals stored in the second storage capacitor Ci217 during the (N−1) integration operations approach a value substantially equal to the difference between the first and second potentials. Even when the integration operations are performed, signals are not substantially stored, resulting in saturation. Specifically, since the smallest number of the integration operations is (N−1), it will be understood that capacitance ratio Ci/Cs of the second storage capacitor Ci217 to the first storage capacitor Cs214 is required to be at least (N−1) or more. Therefore, Ci/Cs>N−1 corresponds to a minimum requirement. In addition, since the n integration operations are performed within the read period for one row, the number of the integration operations in one frame is (N−1)×n. In this case, it will be appreciated that Ci/Cs is more preferably (N−1)×n or more, i.e., preferably satisfies a relationship given by Ci/Cs>(N−1)×n.

Note that an upper limit of the capacitance ratio Ci/Cs of the second storage capacitor Ci217 to the first storage capacitor Cs214 is not particularly limited and can be set to, e.g., Ci/Cs≤10×(N−1)×n or Ci/Cs≤2×(N−1)×n.

Figure 4:
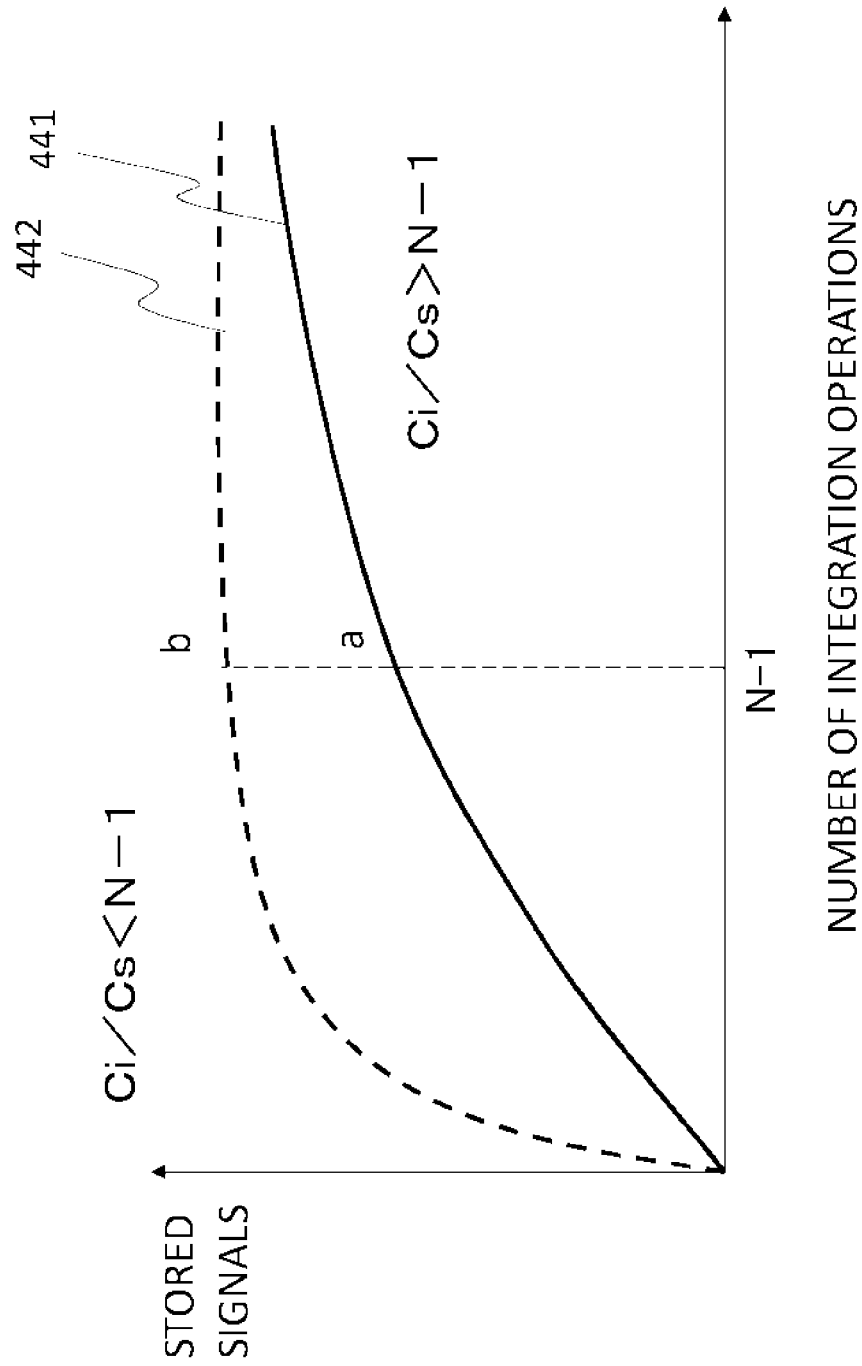
FIG. 4 is a graph illustrating a relationship between the number of integration operations and stored signals according to the first aspect.

FIG. 4 is a graph illustrating a relationship between the number of the integration operations and signals stored in the second storage capacitor Ci217. A solid line 441 represents the signals stored in the Ci217 with respect to the number of the integration operations when Ci/Cs>N−1 is satisfied. A broken line 442 represents the signals stored in the Ci217 with respect to the number of the integration operations when Ci/Cs<N−1 is satisfied. The signals stored in the Ci217 with respect to the number (N−1) of the integration operations when Ci/Cs<N−1 is satisfied are in the vicinity of saturation as at a point b. In the vicinity of saturation mentioned above, even when the integration operations are performed, signals are not substantially stored, and a sufficient noise reducing effect achieved by increasing the integration operations cannot be obtained. Consequently, an excellent image cannot be obtained. Meanwhile, when Ci/Cs can be set as high as in Ci/Cs>N−1, the signals stored in the Ci217 when the number of the integration operations is (N−1) are sufficiently smaller than saturation as at a point a. Consequently, signals can be stored in the Ci217 by the integration operations, and therefore it is possible to obtain a noise reducing effect due to the integration operations and an excellent image.

In the first aspect, the one terminal of each of the SWs215, the second storage capacitor Ci217, and the reset switch SWr218 is connected to the ground. However, a potential to which the one terminal of each of such components is connected is not limited thereto. Even when the one terminal of each of such components is connected to a power source potential, not to a ground potential (grounding potential), as long as the power source potential is a reference potential which does not vary during the sequential operation, the same operation as performed in the first aspect can be performed.

Thus, according to the first aspect, by providing each of the pixels with a signal storing function, it is possible to integrate/store terahertz wave detection signals in each of the pixels even during a period other than the read periods. In each of the pixels, even during a period during which the pixel is not selected to be subjected to reading, it is possible to repeat the integration/storage operation at short periods in which low-frequency noise is removed from the electromagnetic-wave detection element or the like. In addition, since the capacitance ratio between the electrostatic capacitance Ci of the second of storage capacitor Ci217 and the electrostatic capacitance Cs of the first storage capacitor Cs214 is given by $Ci/Cs > (N-1) \times n$, the electrostatic capacitance Ci of the second of storage capacitor Ci217 is not saturated in the $(N-1) \times n$ repeated integration/storage operations. Therefore, it is possible to acquire an image signal with a high signal-to-noise ratio (S/N ratio) due to the noise reducing effect achieved by repeating the integration operations.

Second Aspect

Figure 5:
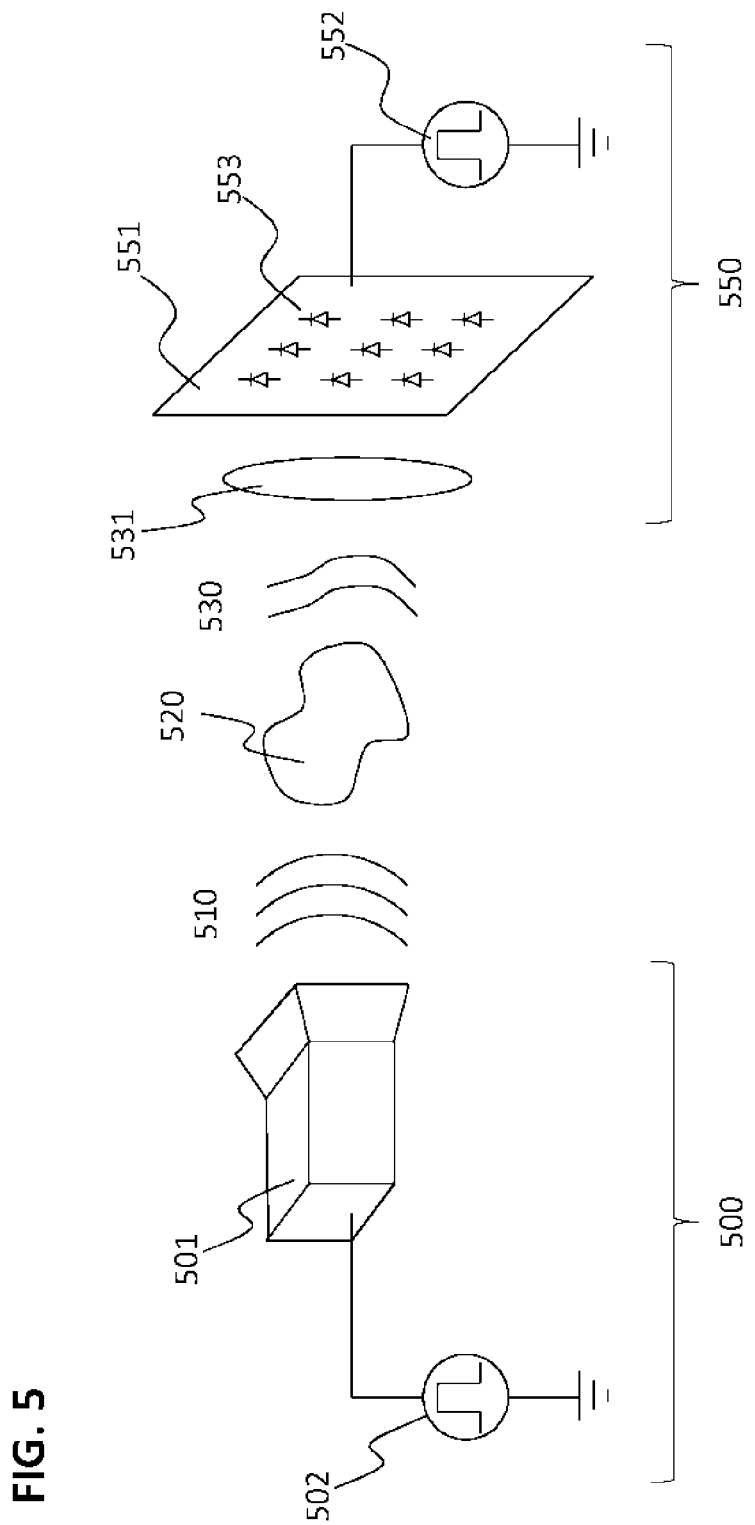
FIG. 5 is a diagram illustrating an array detection element and an imaging system according to a second aspect of the present invention.

Referring to FIG. 5, a description will be given of an imaging system (detection system) according to a second aspect of the present invention. FIG. 5 illustrates the imaging system according to the second aspect including an imaging device (terahertz camera) and an illumination device that provides electromagnetic wave active illumination to a subject. In a terahertz frequency band, unlike in an infrared band, energy of background black-body radiation is low, and consequently active illumination is used in most cases to obtain a required S/N ratio.

As illustrated in FIG. 5, the imaging system according to the second aspect includes an illumination device 500 and an imaging device 550. The illumination device 500 includes a terahertz wave generator 501 and a terahertz-wave control unit 502 that controls an ON/OFF state of a terahertz wave output. The terahertz wave generator 501 may be an electronic device including a negative resistor element such as a resonant tunneling diode, an Esaki diode, or a Gunn diode, an optical device such as a quantum-cascade laser, a p-Ge laser, or a lead-salt laser, or a continuous light source such as a free-electron laser. Alternatively, the terahertz wave generator 501 may also be such a pulse light source as a light-terahertz wave conversion element such as a terahertz parametric generator, a photoconductive element, a Cerenkov radiation-type $LiNbO_3$ terahertz generator, or a uni-traveling-carrier (UTC) photodiode. The terahertz-wave control unit 502 controls the ON/OFF state of a terahertz wave output not only by electrical control, but also by shutter control or the like.

A terahertz wave 510 generated from the illumination device 500 illuminates a subject 520. A terahertz wave 530 transmitted by the subject 520 and including information on the subject is incident on the imaging device 550. The imaging device 550 may also include an objective lens 531 between the imaging device 550 and the subject 520. Since the second aspect uses a two-dimensional-array detection element 551, it is possible to provide a focal plane array. Thus, in the second aspect, the imaging system includes the objective lens 531 disposed between the subject and the two-dimensional-array detection element 551 in which pixels are arranged in two dimensions. Note that FIG. 5 illustrates a configuration which detects the terahertz wave 530 transmitted by the subject 520, but the imaging device 550 may also detect a terahertz wave reflected by the subject 520.

The imaging device 550 is configured to include the two-dimensional-array detection element 551 and a control signal generator 552. Each of the pixels in the two-dimensional-array detection element 551 has the same configuration as that of each of the pixels 101 in the first aspect and includes an electromagnetic-wave detection element 553. As the electromagnetic-wave detection element 553, a Schottky barrier diode or a self-switching diode capable of responding to a preferred operation frequency (10 kHz to 100 MHz) for turning ON/OFF a terahertz-wave light source is used preferably. Alternatively, the electromagnetic-wave detection element 553 may preferably be a rectification detector such as a metal-insulator-metal (MIM) diode, a transistor using electron-plasma self-mixing in a channel layer such as, e.g., a FET or a HEMT, or the like. Still alternatively, the electromagnetic-wave detection element 553 may also be a quantum-well-infrared-photodetector (QWIP) using a quantum well, or a quantum-type detector using a quantum Hall effect. In other words, the electromagnetic-wave detection element 553 may be an element selected from the group consisting of a rectification-type detector, the transistor, and the quantum-type detector.

The terahertz-wave control unit 502 in the illumination device 500 is formed to be synchronized with the control signal generator 552. Accordingly, the electromagnetic-wave detection element 553 detects an electromagnetic wave in synchronization with the presence or absence of radiation from the terahertz wave generator 501. Accordingly, e.g., a control frequency for the terahertz wave generator 501 is the same as a frequency of a control signal output from the control signal generator 552. Information transmission between the terahertz-wave control unit 502 and the control signal generator 552 may be performed either wiredly or wirelessly. The terahertz-wave control unit 502 may also have a function of being able to adjust an ON/OFF timing for the terahertz wave output.

A description will be given of a more specific imaging device in the following example.

Embodiment 1

Figure 6A:
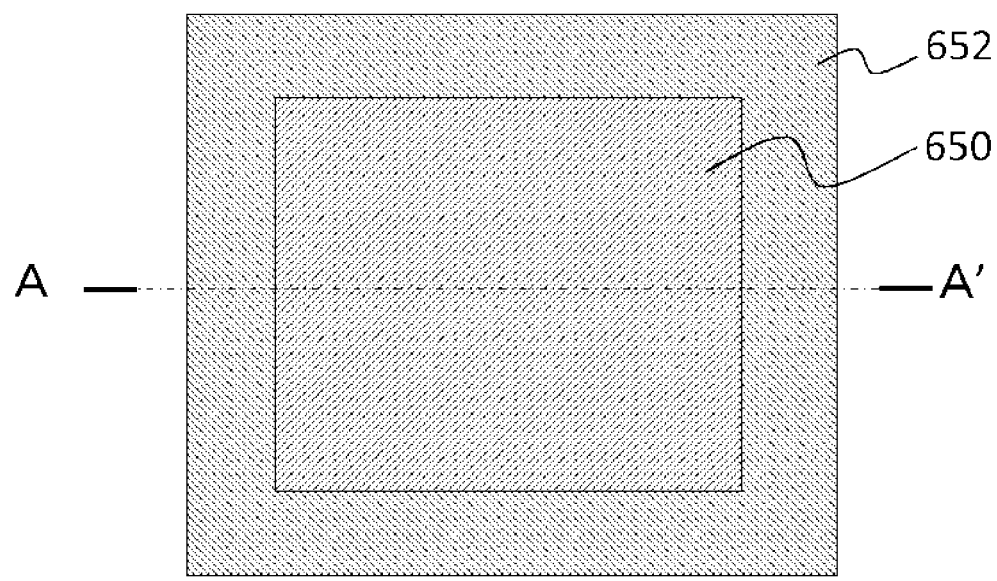
FIGS. 6A and 6B are diagrams each illustrating a substrate structure of a two-dimensional-array detection element according to a first embodiment of the present invention.
Figure 6B:
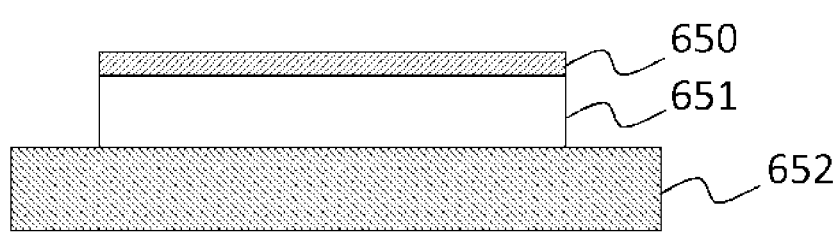
Figure 7:
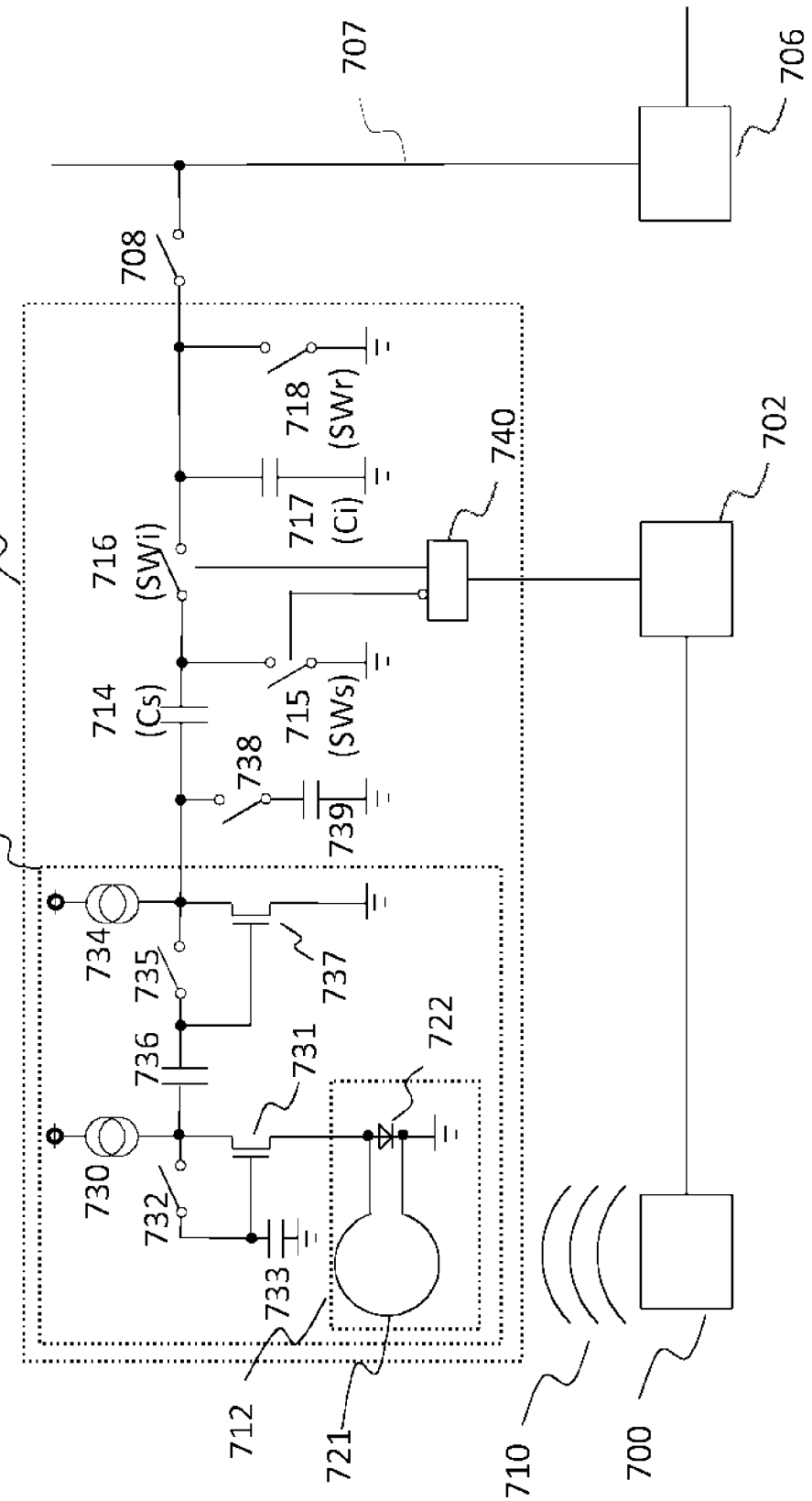
FIG. 7 is a diagram illustrating an imaging device according to the first embodiment and a configuration of pixels therein.

Using FIGS. 6A, 6B, and 7, Embodiment 1 which is a more specific example corresponding to the first aspect will be described. A terahertz camera in an imaging system according to the first embodiment includes a two-dimensional-array detection element for performing imaging using a terahertz wave. FIGS. 6A and 6B illustrate a substrate structure of the two-dimensional-array detection element, in which FIG. 6A is a plan view and FIG. 6B is a crosssectional view taken along a line A-A' in FIG. 6A. FIG. 7 illustrates an imaging device and a configuration of pixels therein.

As illustrated in FIGS. 6A and 6B, the two-dimensional-array detection element is configured to include an antenna substrate 650, a circuit substrate 651, and a supporting substrate 652. The antenna substrate 650 and the circuit substrate 651 are bonded together and electrically connected via a through electrode. The circuit substrate 651 is mounted on the supporting substrate 652.

A pixel 701 in FIG. 7 represents one of a plurality of pixels arranged in an, e.g., approximately 100×100 two-dimensional array configuration. The pixel 701 includes an electromagnetic-wave detection element 712 formed on the antenna substrate 650. The electromagnetic-wave detection element 712 is a photoelectric conversion element that converts a terahertz wave to an electrical signal and has a spectral sensitivity to a terahertz wave. The electromagnetic-wave detection element 712 includes a loop antenna 721 formed of a conductive metal thin film made of aluminum or the like and a rectification element 722. A resonance frequency of the loop antenna 721 is adjusted to be equal to a frequency of a terahertz wave 710 generated from the illumination device 700. For example, the rectification element 722 is a Schottky barrier diode. The Schottky barrier diode, which functions in a terahertz wave band and operates at a room temperature, is appropriate for the rectification element 722. Each of the elements of the pixel 701 other than the electromagnetic-wave detection element 712 is formed on the circuit substrate 651. The circuit substrate 651 includes not only the pixels 701, but also selection switches 708, read lines 707, a vertical scanning circuit required to drive the pixels, signal lines, and the like. A circuit of the circuit substrate 651 is formed on a silicon substrate by using a standard CMOS process.

A signal from the electromagnetic-wave detection element 712 is amplified by a gate-grounded amplification circuit including a current source 730, a reset switch 732, a bias capacitor 733, and an NMOS transistor 731. The amplified signal is further amplified by a source-grounded amplification circuit including a current source 734, a reset switch 735, and an NMOS transistor 737. The gate-grounded amplification circuit and the source-grounded amplification circuit are coupled to each other via an AC coupling capacitor 736. A reset operation effected by reset switches 732 and 735 is performed once in one frame or once within the read period for one row to determine operating points for the NMOS transistors 731 and 737. An output signal from the electromagnetic-wave detection element 712 is as small as about several hundreds of microvolts and has a voltage corresponding to a magnitude of a terahertz wave input thereto. The output signal from the electromagnetic-wave detection element 553 is amplified by the gate-grounded amplification circuit and the source-grounded circuit with a gain of several thousands and output as the output signal from the detector 711.

A switch 738 and a capacitor 739 are included in a high-frequency cut filter to function to remove electrical noise from the signal from the detector 711. The switch 738 is a selection switch for a filter function.

A non-overlap circuit 740 supplies, based on the signal received from the signal generator 702, a control signal which prevents switches SWs715 and SWi716 from being simultaneously turned ON to the SWs715 and SWi716. Thus, charges in a second storage capacitor Ci717 are prevented from flowing out thereof. A frequency of the control signal for the SWs715 and SWi716 is set to several megahertz. The electromagnetic-wave detection element 712 may generate low-frequency noise such as 1/f noise. A frequency at which the low-frequency noise is buried in white noise is referred to as a noise corner frequency. When it is possible to operate the control signal at a frequency of not less than the noise corner frequency, the low-frequency noise can effectively be reduced.

The signal generator 702 is provided outside the circuit substrate 651. The signal generator 702 outputs, to the non-overlap circuit 740, an original signal of the signal that controls the switches SWs715 and SWi716. The signal generator 702 also outputs, to the illumination device 700, a light source ON/OFF control signal at the same frequency as the frequency of the signal to be output to the non-overlap circuit 740.

The illumination device 700 radiates the terahertz wave 710 of several terahertz at the same period as that of the control signal from the signal generator 702, while repeating radiation and non-radiation. To generate the terahertz wave, the illumination device 700 uses an element in which a resonant tunneling diode (RTD) and a patch antenna serving as a resonator are integrated. A terahertz wave generation source is not limit thereto, and a known terahertz wave generation source can be used.

To specifically show a technical effect of the first embodiment, a consideration will be given to a configuration in which a first storage capacitor Cs714 has a capacitance of 10 fF and the second storage capacitor Ci717 has a capacitance of 250 pF. Since the capacitance ratio Ci/Cs of the electrostatic capacitance Cs of the first storage capacitor Cs214 to the electrostatic capacitance Ci of the second storage capacitor Ci217 is 25000, about 25000 or more integration operations are possible. When a noise component is random and 25000 integration operations are performed, due to the averaging effect, a noise amount can be reduced to $1/\sqrt{25000}=1/158$ of that when one integration operation is performed. Even when noise components include 1/f noise, the same effect is achieved. The charges stored in the electrostatic capacitance Ci of the second storage capacitor Ci217 are read as a voltage into the read line 707 via the selection switch 708. The read signal is digitized in a signal processing circuit 706 outside the circuit substrate.

A detailed description is given herein of a low-frequency noise reduction in the first embodiment. An output from the detection element 712 when the illumination device 700 radiates is amplified by a subsequent-stage amplification circuit and input as a radiation period potential (second potential) to the first storage capacitor Cs714. Then, the output from the detection element 712 when the illumination device 700 does not radiate is amplified by the subsequent-stage amplification circuit and input as a non-radiation period potential (first potential) to the first storage capacitor Cs714. When the SWs715 and SWi716 are controlled by an output pulse from the non-overlap circuit 740, by one integration operation, a signal proportional to the difference between the radiation period potential and the non-radiation period potential is integrated with the signals stored in the second storage capacitor Ci717. In other words, this operation serves as a subtraction operation (non-radiation period potential is subtracted from radiation period potential) within a period during which the SWs715 and SWi716 are controlled. On an output signal from the detector 711, low-frequency noise such as 1/f noise is superimposed. As a result, in the radiation period potential and the non-radiation period potential each input to the Cs714, the low-frequency noise mentioned above appears as a dc-type error. In the first embodiment, the frequency of the signal that controls the SWs715 and SWi716 is set to several megahertz, which is high relative to the low-frequency noise of the detector 711. Accordingly, as previously described, a value integrated with the capacitance of the second storage capacitor Ci717 serves as a signal after the subtraction operation, and therefore it will be understood that the dc-type error within the time range is reduced by the subtraction operation. This is because, when the period of one integration operation is assumed to be T, the subtraction operation serves as a low-frequency cut filter for a frequency of not more than 1/T to cut a component at a frequency of not more than 1/T among noise components which are larger at low frequencies, such as 1/f noise.

By thus controlling the SWs715 and SWi716 at a frequency higher than the noise corner frequency of the detector 711, the 1/f noise from the detector 711 is removed, and noise components of the output signal from the pixel 701 can be reduced only to the physically unavoidable white noise.

Meanwhile, high-frequency noise higher in frequency than the noise corner frequency, such as the white noise (shot noise), can be reduced using the NMOS transistor in the source-grounded amplification circuit, the capacitor 739, and a parasitic capacitance. In the first embodiment, the switch 738 is controlled to reduce an output from the source-grounded amplification circuit at a higher frequency of not less than several megahertz. In other words, it is possible to reduce the white noise by controlling the switch 738 based on a value of the period T of the integration operation and causing a higher-frequency response from the source-grounded amplification circuit to serve as the "high-frequency cut filter which attenuates frequencies higher than 1/T". In addition, effective signals obtained (by subtracting the non-radiation period potential from the radiation period potential) in the electromagnetic-wave detection element 712 are distributed in the vicinity of the frequency 1/T, and therefore the required signals are not reduced.

Thus, in the imaging device in the first embodiment, the period T of one integration operation is set such that the frequency 1/T of the integration operation is not less than the corner frequency corresponding to the frequency at which respective spectrum densities of the 1/f noise and the shot noise (white noise) each generated from the detector are equal. In the first embodiment, the capacitance of the first storage capacitor Cs714 is 10 fF and the capacitance of the second storage capacitor Ci717 is 250 pF, i.e., Ci/Cs is as large as 25000. When N=100 is substituted in Ci/Cs>(N−1)×n, even when n has a large value of 252, the requirement can be satisfied. When n is increased under a condition under which the read period for one row is to be constant, it is possible to increase the frequency of the control signal for the SWs and SWi. For example, when the read period for one row is 30 µs in the first embodiment, the period of the control signal for the SWs715 and SWi716 is 30 µs/252=0.12 µs, and the frequency of the control signal for the SWs715 and SWi716 is allowed to have a high frequency of 5 MHz. This reduces the 1/f noise of not more than 5 MHz from the electromagnetic-wave detection element 712 and allows an excellent imaging device to be configured.

As described above, the operation in the first embodiment can provide the noise reducing effect achieved by repeating the integration operation, can reduce the low-frequency noise component at a frequency of not more than 1/T, and can provide an excellent imaging signal. In addition, when the frequency 1/T of the integration operation is set to be not less than the corner frequency of noise as in the first embodiment, the 1/f noise is removed, and an excellent imaging signal can be obtained. When the frequency response from the amplification circuit is further reduced to serve as the high-frequency cut filter which attenuates frequencies higher than the frequency 1/T of the integration operation, a more excellent imaging signal can be obtained.

While the aspects and the embodiment of the present invention have been described heretofore, the present invention is not limited to these aspects and embodiment and can variously be modified and changed within the scope without departing from the gist thereof. For example, in the first embodiment, the detector using the loop antenna and the Schottky barrier diode for the electromagnetic-wave detection element and using the gate-grounded amplification circuit and the source-grounded amplification circuit for the amplifier is used, but another detector may also be used. As long as the detector repeatedly outputs two values, a noise reducing effect can be obtained by repeating the integration operation. In addition, when the detector to be used can be operated at a high speed, it is possible to reduce low-frequency noise resulting from the higher-speed integration operation.

The imaging device in each of the embodiments described above is an array sensor in which the pixels are two-dimensionally arranged in the N rows and the M columns (N>1 and M>1). However, the present invention is also applicable to a line sensor (N=1 and M>1) and to a single-pixel sensor (N=M=1). Since the imaging device (detection device) according to the present disclosure also has a function of storing signals from the detector, the imaging device can repeat the integration/storage operation a plurality of times during the read period. When N=1 is satisfied and when the number of the integration/storage operations during the read period is assumed to be n (n>1), it is appropriate to set a capacitance ratio between the electrostatic capacitance Ci of the second of storage capacitor Ci217 and the electrostatic capacitance Cs of the first storage capacitor Cs214 to Ci/Cs>n. In addition, when the frequency of the integration operation is set to be not less than the corner frequency of the low-frequency noise, the effect of reducing the low-frequency noise can be obtained in the same manner as described above.

The electromagnetic wave to be detected by the imaging device according to the present invention is not limited to the terahertz wave. Even when an electromagnetic wave in a frequency band lower than that of the terahertz wave, such as a microwave or a millimeter wave, or an electromagnetic wave in a frequency band higher than that of the terahertz wave, such as infrared light or visible light, is used as a detection target, the same effects can be obtained from the imaging device (detection device) according to the present disclosure.

The imaging device and the detection system according to the present invention can also be provided in a moving body such as a train or an automobile.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-145527, filed on Aug. 7, 2019, which is hereby incorporated by reference herein in its entirety.

What is claimed is:

1. A detection device comprising:
a detector configured to detect an electromagnetic wave;
a first capacitor connected to the detector;
a first switch and a second switch each connected to a terminal of the first capacitor opposite to the detector; and
a second capacitor connected to a terminal of the second switch opposite to the first capacitor,
wherein each of a terminal of the first switch opposite to the first capacitor and a terminal of the second capacitor opposite to the second switch is connected to a reference potential,
wherein the detector is directly connected to another terminal of the first capacitor, and
wherein an integration operation of turning ON/OFF the first switch and then turning ON/OFF the second switch while maintaining the first switch in an OFF state is repeatedly performed a plurality of times.

2. The detection device according to claim 1, wherein a period T of one integration operation is such that a frequency 1/T of the integration operation is higher than a corner frequency of low-frequency noise generated from the detector.

3. The detection device according to claim 1, further comprising a high-frequency cut filter provided between the detector and the first capacitor.

4. The detection device according to claim 1, wherein the ON/OFF operation of the second switch is synchronized with an ON/OFF operation of a light source capable of being subjected to ON/OFF control.

5. The detection device according to claim 1, wherein the detector outputs a potential corresponding to an intensity of the electromagnetic wave incident on the detector.

6. The detection device according to claim 1, wherein the detector includes an electromagnetic-wave detection element that detects an electromagnetic wave within a frequency band of at least part of frequencies between 0.3 THz and 30 THz, and an amplification circuit that amplifies an output signal from the electromagnetic-wave detection element.

7. The detection device according to claim 6, wherein the electromagnetic-wave detection element includes a loop antenna and a rectification element connected to the loop antenna.

8. A detection system comprising:
a light source that radiates an electromagnetic wave within a frequency band of at least part of frequencies between 0.3 THz and 30 THz; and
the detection device according to claim 1 for detecting the electromagnetic wave.

9. The detection system according to claim 8, further comprising a signal generator that generates a control signal for controlling the ON/OFF of the second switch which is synchronized with an ON/OFF operation of the light source.

10. The detection device according to claim 1, further comprising an inverter or a NOT gate,
wherein a control-signal is supplied to the first switch and the inverter or the NOT gate and an output signal from the inverter or the NOT gate is supplied to the second switch.

11. The detection device according to claim 1, wherein a plurality of detection cells are arranged in N rows and M columns where N and M are each an integer of one or more, each of the detection cells including the detector, the first capacitor, the first switch, the second switch and the second capacitor.

12. The detection device according to claim 11, wherein N is an integer of two or more, and an electrostatic capacitance Cs of the first capacitor and an electrostatic capacitance Ci of the second capacitor satisfy a relationship given by $Ci/Cs > N-1$.

13. The detection device according to claim 1, further comprising:
a first substrate on which the detector is disposed; and
a second substrate on which the first switch and the second switch are disposed.

14. The detection device according to claim 13, wherein the first substrate and the second substrate are bonded together and electrically connected via a through electrode.

15. The detection device according to claim 13, wherein the second substrate is a silicon substrate.

16. A detection device comprising:
pixels arranged in N rows and M columns where N and M are each an integer of one or more, each of the pixels including:
a detector configured to detect an electromagnetic wave;
a first capacitor connected to the detector;
a first switch and a second switch each connected to a terminal of the first capacitor opposite to the detector; and
a second capacitor connected to a terminal of the second switch opposite to the first capacitor,
wherein each of a terminal of the first switch opposite to the first capacitor and a terminal of the second capacitor opposite to the second switch is connected to a reference potential,
wherein in one integration operation, an output from the detector has a first potential and a second potential,
wherein an OFF operation of an ON/OFF operation of the first switch is performed at a time when the output from the detector is at the first potential or at a time when the output from the detector is at a potential in a vicinity of the first potential, and wherein an OFF operation of an ON/OFF operation of the second switch is performed at a time when the output from the detector is at the second potential or at a time when the output from the detector is at a potential in a vicinity of the second potential.

17. The detection device according to claim 16, further comprising:
a first substrate on which the detector is disposed; and
a second substrate on which the first switch and the second switch are disposed.

18. The detection device according to claim 17, wherein the first substrate and the second substrate are bonded together and electrically connected via a through electrode.

19. The detection device according to claim 18, wherein the second substrate is a silicon substrate.

20. A detection device comprising:
pixels arranged in N rows and M columns where N and M are each an integer of one or more, each of the pixels including:
a detector configured to detect an electromagnetic wave;
a first capacitor connected to the detector;
a first switch and a second switch each connected to a terminal of the first capacitor opposite to the detector; and
a second capacitor connected to a terminal of the second switch opposite to the first capacitor,
wherein each of a terminal of the first switch opposite to the first capacitor and a terminal of the second capacitor opposite to the second switch is connected to a reference potential,
wherein signal reading from the pixels is performed sequentially in each of the rows,
wherein the integration operation is performed n times, where n is an integer of one or more, during a read period for one row, and
wherein the electrostatic capacitance Cs of the first capacitor and the electrostatic capacitance Ci of the second capacitor satisfy a relationship given by Ci/Cs> (N−1)×n.

21. The detection device according to claim 20, further comprising:
a first substrate on which the detector is disposed; and
a second substrate on which the first switch and the second switch are disposed.

22. The detection device according to claim 21, wherein the first substrate and the second substrate are bonded together and electrically connected via a through electrode.

23. The detection device according to claim 22, wherein the second substrate is a silicon substrate.

24. A detection device comprising:
a detector configured to detect an electromagnetic wave;
a first capacitor including a first terminal connected directly to a transmission line of the detector and a second terminal;
a first switch including a first terminal connected to the second terminal of the first capacitor and a second terminal connected to a first reference potential;
a second switch including a first terminal connected to the second terminal of the first capacitor and a second terminal;
a second capacitor including a first terminal connected to the second terminal of the second switch and a second terminal connected to a second reference potential; and
a control circuit configured to control supply of a first signal that brings the first switch into an ON state and a second signal that brings the second switch into an ON state,
wherein the control circuit controls so that the first signal and the second signal are not supplied simultaneously during a read period of signals based on detection of the electromagnetic wave.

25. The detection device according to claim 24, wherein, during the read period, the control circuit supplies the second signal a plurality of times,
the signals based on detection of the electromagnetic wave are transferred to the second capacitor a plurality of time by the second signal supplied a plurality of time, and
the second capacitor integrates the signals transferred a plurality of times.

26. The detection device according to claim 24, wherein the control circuit controls the supply of the first signal and the second signal in synchronization with an ON/OFF operation of a light source.

27. The detection device according to claim 24, wherein a plurality of detection cells are arranged in N rows and M columns where N and M are each an integer of one or more, each of the detection cells including the detector, the first capacitor, the first switch, the second switch and the second capacitor.

28. The detection device according to claim 24, further comprising:
a first substrate on which the detector is disposed; and
a second substrate on which the first switch and the second switch are disposed.

29. The detection device according to claim 28, wherein the first substrate and the second substrate are bonded together and electrically connected via a through electrode.

30. The detection device according to claim 28, wherein the second substrate is a silicon substrate.

31. A detection system comprising:
a light source that radiates an electromagnetic wave within a frequency band of at least part of frequencies between 0.3 THz and 30 THz; and
the detection device according to claim 24 for detecting the electromagnetic wave.

32. The detection device according to claim 24, further comprising an inverter or a NOT gate,
wherein the control-signal is supplied to the first switch and the inverter or the NOT gate and an output signal from the inverter or the NOT gate is supplied to the second switch.

33. The detection device according to claim 24, wherein an integration operation of turning ON/OFF the first switch and then turning ON/OFF the second switch while maintaining the first switch in an OFF state is repeatedly performed a plurality of times.

* * * * *